United States Patent [19]

Lortz et al.

[11] Patent Number: 5,370,333
[45] Date of Patent: Dec. 6, 1994

[54] DELAYED LOCKING RETRACTOR

[75] Inventors: Allan R. Lortz, Noblesville; David D. Merrick, Indianapolis, both of Ind.

[73] Assignee: Indiana Mills and Manufacturing, Inc., Westfield, Ind.

[21] Appl. No.: 40,938

[22] Filed: Mar. 31, 1993

[51] Int. Cl.⁵ .............................................. B60R 22/40
[52] U.S. Cl. ................................ 242/384.1; 297/478; 242/384.5
[58] Field of Search ............... 242/107.4 D, 107.4 A, 242/107.4 R; 280/806, 807, 808; 297/474–480

[56] References Cited

U.S. PATENT DOCUMENTS

| | | |
|---|---|---|
| 3,603,525 | 9/1971 | Pringle et al. |
| 3,630,465 | 12/1971 | Cocheran. |
| 3,632,057 | 1/1972 | Pringle. |
| 3,635,419 | 1/1972 | Pringle. |
| 3,648,946 | 3/1972 | Stoffel. |
| 3,724,773 | 4/1973 | Fisher. |
| 3,838,832 | 10/1974 | Romanzi et al. ............ 242/107.4 A |
| 3,858,825 | 1/1975 | Weman. |
| 3,876,031 | 4/1975 | Stouffer. |
| 3,999,723 | 12/1976 | Magyar ................... 242/107.4 D X |
| 4,529,144 | 7/1985 | Fohl. |
| 4,537,363 | 8/1985 | Thomas. |
| 4,570,873 | 2/1986 | Kurtti ...................... 242/107.4 D X |
| 4,585,186 | 4/1986 | Izuchi et al. ................ 242/107.4 D |
| 4,725,014 | 2/1988 | Ueda ............................ 242/107.4 D |

*Primary Examiner*—John M. Jillions
*Attorney, Agent, or Firm*—Woodard, Emhardt, Naughton, Moriarty & McNett

[57] ABSTRACT

A pre-emergency delayed locking retractor. A pawl is movably mounted to a retractor frame and is lockingly engagable with spool ratchet teeth with a web wound on the spool. A cam wheel mounted to the retractor frame or a web follower mounted to the pawl are operable to keep the pawl apart from the ratchet teeth until a predetermined amount of web is withdrawn. An inertial device engaged with an end of the pawl forces the pawl away from the ratchet teeth until the retractor frame is moved. The inertial device includes a mass mounted in an unstable fashion to the frame with an upstanding finger contactable by an arm fixedly mounted to an end of the pawl.

15 Claims, 7 Drawing Sheets

DELAYED LOCKING RETRACTOR

BACKGROUND OF THE INVENTION

1. Field of the Invention:

This invention is in the field of retractors used with seat belts.

2. Description of the Prior Art:

Retractors for holding seat belts are generally either automatic locking retractors or emergency locking retractors. One widely used type of seat belt device is the automatic locking retractor wherein once the desired length of seat belt webbing has been pulled or extended from the retractor, a slight retraction or release of tension caused by a slight retracting rotation of the web spool engages an internal locking mechanism preventing further extension of the web. The internal locking mechanism may include a clutch plate rotatably mounted about the spool axis which normally engages and holds a pawl apart frown ratchet teeth formed on the spool. Extension of the predetermined amount of web from the retractor results in rotation of the cam wheel positioning the pawl in a recess formed in the cam wheel thereby allowing the pawl to lockingly engage the spool ratchet teeth preventing further extension. The web must then be retracted into the retractor and rewound on the spool positioning the cam plate apart from the ratchet teeth and allowing for subsequent web extension. The automatic locking retractor thereby locks the web in place once the web has been extended and the web tongue inserted into the buckle mounted to the seat. The disadvantage of an automatic locking retractor is that frequently the retractor will lock if the web is pulled outwardly and then slightly released prior to inserting the web tongue into a buckle. The web must then be retracted and then extended again before the web tongue is locked to the buckle. Automatic locking retractors are also known which replace the rotatable cam wheel by a web follower mounted to the pawl. The web follower contacts the web when fully wound on the spool thereby keeping the pawl located apart from the ratchet teeth until the web is extended thereby decreasing the diameter of the web on the spool and allowing the web follower and pawl to move inwardly until the pawl lockingly engages the spool ratchet teeth.

Emergency locking retractors are known to allow the spool to freewheel even though the web is pulled outwardly to its in use position and the web tongue is locked to the corresponding buckle. An inertial device is operable to normally hold the retractor pawl apart from the spool ratchet teeth and to release the pawl once a predetermined amount of force is applied to the inertial device such as experienced in emergency conditions during rapid de-acceleration or vehicle crash conditions. The advantage of an emergency locking retractor is that the web may be extended over the occupant with the tongue then locked to the corresponding buckle even though the web still may be further extended or retracted as required by the occupant moving relative to the retractor.

Child vehicle seats are available to amount atop the normal passenger seat in a vehicle. Likewise, vehicles are available having an integrated child seat originally built into the passenger seat. In either case, the web or harness must be pulled outwardly from the seat and extended across the child with the web tongue then being lockingly engaged with the corresponding buckle. It is customary to provide a retractor beneath the seat to store the harness web on a spool while allowing the web to be pulled outwardly to an in use position. Neither the prior automatic locking retractors or emergency locking retractors provide the most convenient mechanism for retraction and extension of the web. For example, the automatic locking retractor will automatically lock once a predetermined amount of web has been extended and the web tension slightly released. It can be imagined that it is difficult to place and hold a child in a child seat while at the same time pulling out the web and locking the tongue to the buckle. Frequently, the automatic locking retractor will lock prior to the tongue being lockingly engaged with the buckle necessitating complete retraction of the web and a repeat of the extension cycle. Likewise, the emergency locking retractor, since the spool is not locked, provides the unsatisfactory result that the child may pull the web outwardly and move from the child's seat while the driver is occupied with driving duties. What is needed is a retractor to allow the web to be freely extended and retracted so that the tongue may be inserted into the buckle. Likewise, once the tongue and buckle are locked together, it may be desirable to pull the web outwardly further or retract the web in order to properly position the web relative to the seat and child. At the same time, it is desirable to have such a retractor which will immediately lock upon vehicle movement preventing the child from pulling the web outwardly and moving from the child seat while the vehicle is in motion. In the case of emergency locking retractor, the retractor will lock upon being subjected to a predetermined amount of force such as existing in a rapid de-acceleration but will unlock once the vehicle assumes a level condition without rapid acceleration or de-acceleration. Thus, the child seat retractor should not only lock upon initial vehicle motion but should remain locked even though the vehicle comes to a complete stationary position. The child seat retractor should remain locked until the tongue is unbuckled and the web retracted to its initial position. Last, it is desirable to provide such a retractor which will immediately lock once the web has been extended mad a condition encountered such as a collision with the vehicle prior to initial driving motion. Disclosed herein is such a pre-emergency delayed locking retractor.

It is known to provide automatic locking retractors with some type of time delay. For example. U.S. Pat. Nos. 3,603,525, 3,630,465, 3,858,825 and 3,876,031 disclose delay mechanisms which include an electromagnet or other type of electrical switch for operating the retractor. U.S. Pat. No. 3,648,946 discloses a retractor including a time delay achieved by an impeller within a fluid chamber. Likewise, U.S. Pat. No. 3,632,057 discloses a retractor with a time delay achieved via an air piston. U.S. Pat. Nos. 4,529,144 and 3,635,419 disclose a retractor including a time delay utilizing an inertial mass.

SUMMARY OF THE INVENTION

One embodiment of the present invention is a pre-emergency delayed locking retractor comprising a frame, a web, and a spool with the web wound thereon and having a plurality of ratchet teeth formed thereon. The spool is rotatably mounted on the frame and is rotatable between an initial position whereat the web is retracted on the spool and an in-use position whereat the web is extended. A spring is connected between the spool and the frame to urge the spool to rotate in a winding direction to wind the web thereon but yieldable to allow the spool to rotate in an unwinding direction to allow the web to be extended therefrom. A first device mounted on the frame is urged to move to a locked position engaging the teeth and limiting rotation of the spool in the unwinding direction but is yieldable to move to an unlocked position to allow the spool to rotate in the winding direction and the unwinding direction. A second device is operable to retain the first device in the unlocked position until a predetermined amount of web has been extended. A third device is engaged with the first device and has a mass in a first position whereat third device once the predetermined amount of web has been extended retains the first device in the unlocked position until the mass is moved upon pre-emergency movement of the frame allowing the first device to move to the locked position. The first device remains in the locked position once moved to the locked position until the web is rewound to the initial condition and the second device moves the first device to the unlocked position.

Another embodiment of the present invention is a seat for a child in a vehicle comprising a frame, a seat formed to receive a child with the seat mounted on the frame, a harness web movably mounted on the seat and extendable from a initial position whereat the web is not in use to an in-use position whereat the web extends across a child positioned atop the seat, and, a pre-emergency delayed retractor mounted to the frame and operable to windingly retract and to extend the web. The retractor is operable to allow the web to freely extend from the initial position to the in-use position and to be freely extendable and retractable at the in-use position until locked limiting further extension of the web upon the frame moving by being subjected to an external force beyond a predetermined level. The retractor is further operable to remain locked limiting further web extension until the web is retracted to the initial position.

It is an object of the present invention to provide a new and improved child seat locking retractor.

A further object of the present invention is to provide a pre-emergency delayed locking retractor.

Yet a further object of the present invention is to provide a locking retractor allowing the web to be freely extended and retracted at all times prior to vehicle initial movement.

An additional object of the present invention is to provide a locking retractor which will remain locked once a predetermined amount of web has been extended and vehicle motion has been initiated.

Related objects and advantages of the present invention will be apparent in the following description.

DESCRIPTION OF THE PREFERRED EMBODIMENTS

Figure 2:
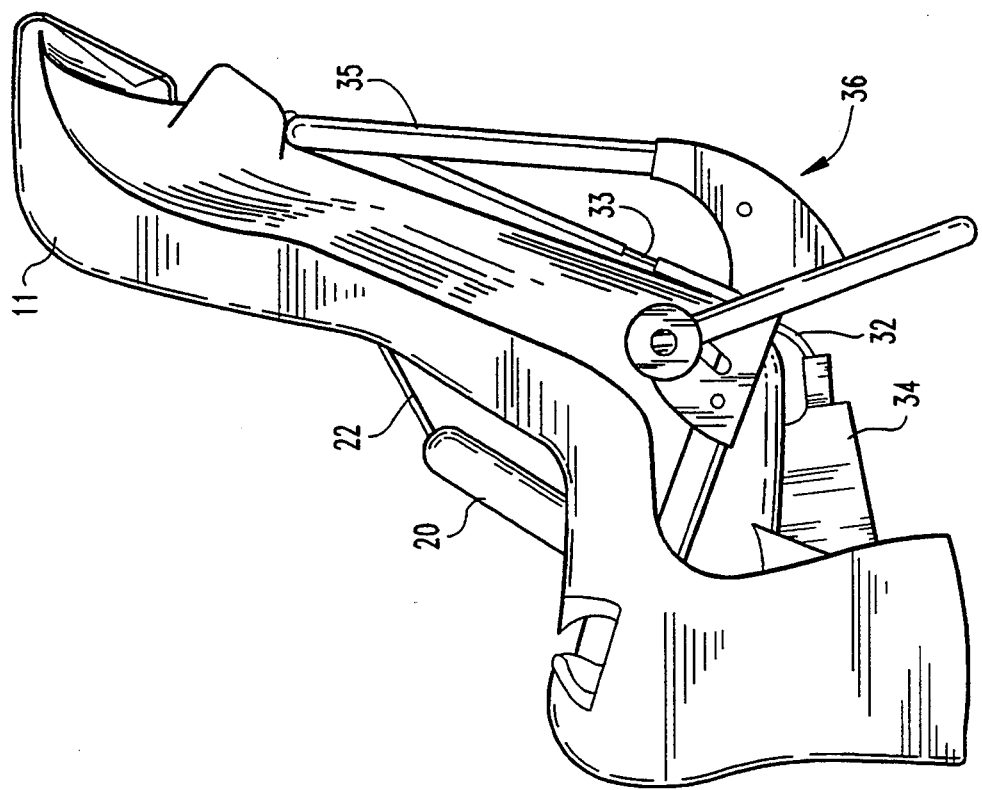
FIG. 2 is a side view of the seat of FIG. 1.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one smiled in the art to which the invention relates.

Figure 1:
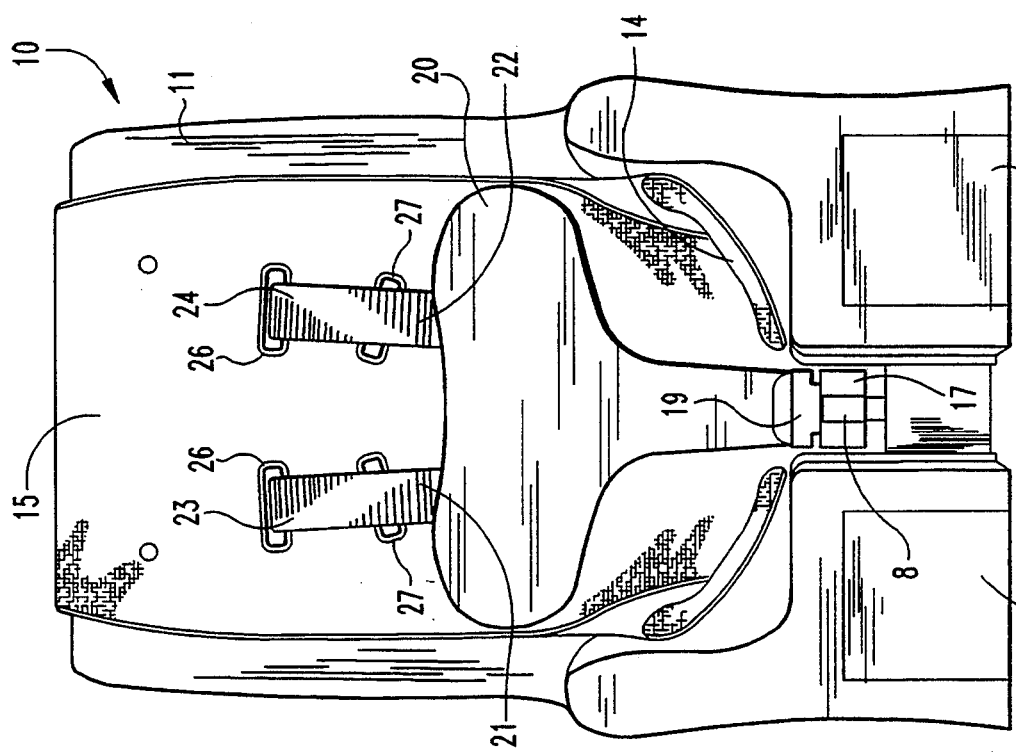
FIG. 1 is a front view of a child seat incorporating the delayed locking retractor.
Figure 3:
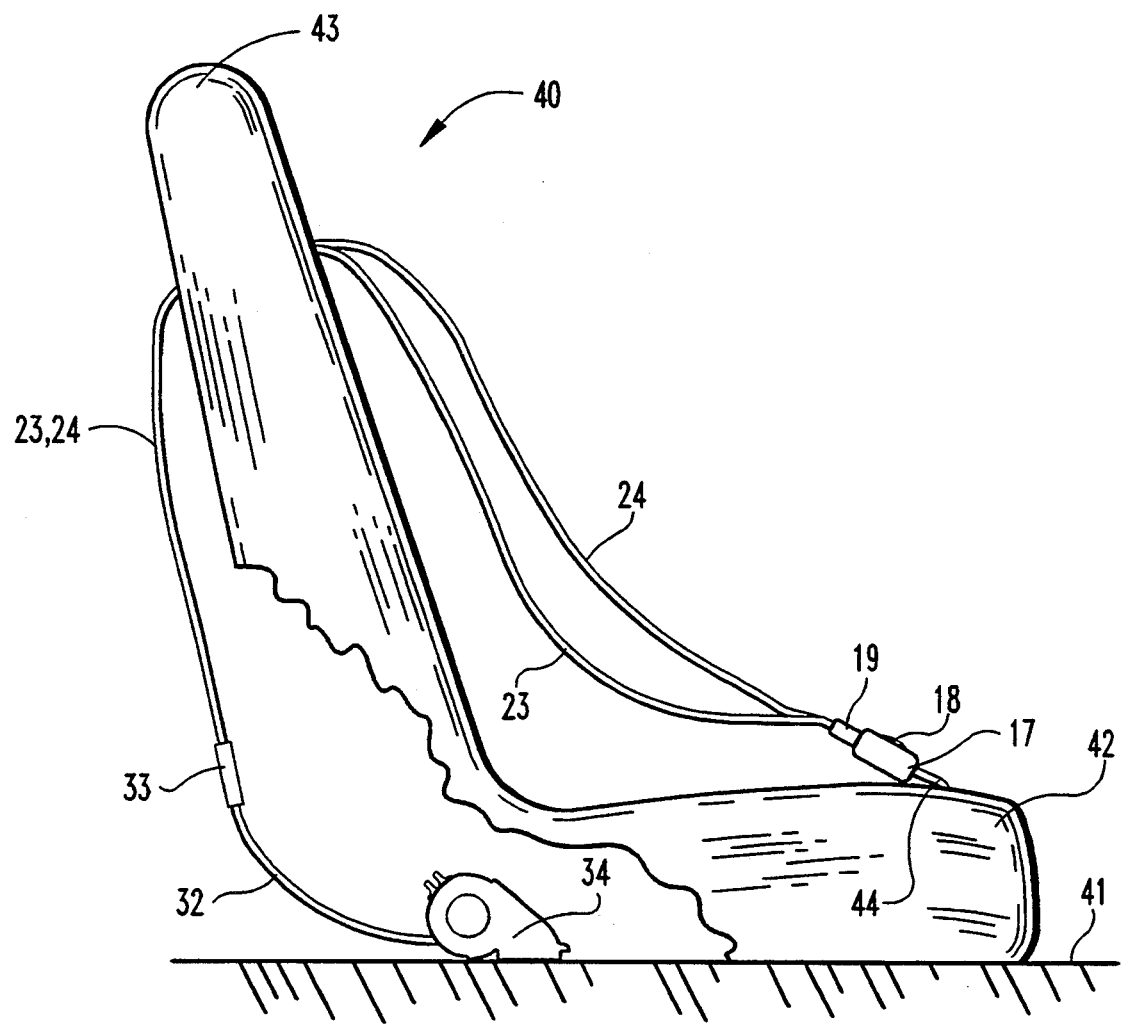
FIG. 3 is a fragmentary cross sectional view of a child seat integrated with the vehicle seat including the delayed locking retractor.

The delayed locking retractor incorporating the present invention may be utilized with both the child seat illustrated in FIGS. 1 and 2 for installation into a vehicle and the child seat shown in FIG. 3 which is integrated into the vehicle seat at the time of original manufacture of the vehicle.

Referring now more particularly to FIGS. 1 and 2, there is shown a child seat 10 including a frame 11 with a pair of downwardly extending legs 12 and 13 positioned beneath a cushioned seat area 14 and a cushioned back supporting area 15. A seat web buckle 17 of conventional construction is mounted to the seat and includes a push button 18 which may be depressed to release a tongue 19 which is shown inserted into the buckle. The tongue is, in turn, attached to a relatively rigid shield 20 which is positioned over the child supported by the seat. Shield 20, in turn, is fixedly secured to ends 21 and 22 respectively of webs 23 and webs 24 extending through the seal and back down to the rear side of the seat to a web connector or a bar 33. A pair of slots 26 are provided in the seat for the webs to extend there through. Likewise, a second pair of slots 27 are positioned beneath slots 26 to enable the webs to be disconnected from bar 33 and to be threaded through the lower positioned slots 27 in the event the child is of small stature. A third web 32 is connected to bar 33 and extends into a retractor 34 mounted to and beneath the seat. A plurality of conventional tubing 35 forms a rear frame 36 which is adjustable to support the child seat at a proper angle upon the vehicle seat.

The child seat shown in FIGS. 1 and 2 is illustrative of only one type of child seat which may be utilized with the delayed locking retractor disclosed herein. For example, shield 20 may be deleted with the bottom ends of webs 23 and 24 being attached directly to a pair of interlockable tongues lockingly insertable into buckle 17. Such a pair of tongues are disclosed in U.S. Pat. No. 5,038,446 which is herewith incorporated by reference. Likewise, the seat shown in FIGS. 1 and 2 is known as a three point arrangement in that the child is secured at the point of attachment of tongue 19 to buckle 17 as well as the pair of locations provided by slots 26 wherein webs 23 and 24 pass therethrough securing the child to the seat. The present invention includes also a seat utilizing a five point attachment such as shown in U.S. Pat. No. 5,031,962 which is herewith incorporated by reference. In the five point arrangement webs 21 and 22 extend slidingly through a pair of interlockable tongues lockingly inserted into buckle 17 with the webs then extending in opposite directions across the child's legs being attached to the opposite sides of the seat, such as shown in the latter patent.

A simplified version of a child seat 40 integrated into the vehicle seat is illustrated in FIG. 3. Seat 40 is fixedly mounted to the vehicle frame 41 being built into the conventional passenger seat. Seat 40 includes a cushioned seat area 42 and cushioned back supporting area 43 with the delayed locking retractor 34 mounted beneath the child seat and affixed to vehicle frame 41. A single web 32 extends outwardly from retractor 34 and is connected to a conventional web bar 33, in turn, attached to the bottom ends of webs 23 and 24 which extend through the back of the seat through a pair of slots such as shown in FIG. 1. Webs 23 and 24 are then attached to either a shield 20 depicted in FIG. 1 or may be attached directly to a single tongue 19, in turn, lockingly inserted into buckle 17 having a push button 18. Buckle 17 is attached to the vehicle frame by means of a web 44 fixedly attached to and extending between the buckle and vehicle frame. As previously explained, a pair of interlockable dual tongues may be utilized in lieu of a single tongue 19 and a five point seating arrangement may be utilized in lieu of a three point seating arrangement.

Figure 4:
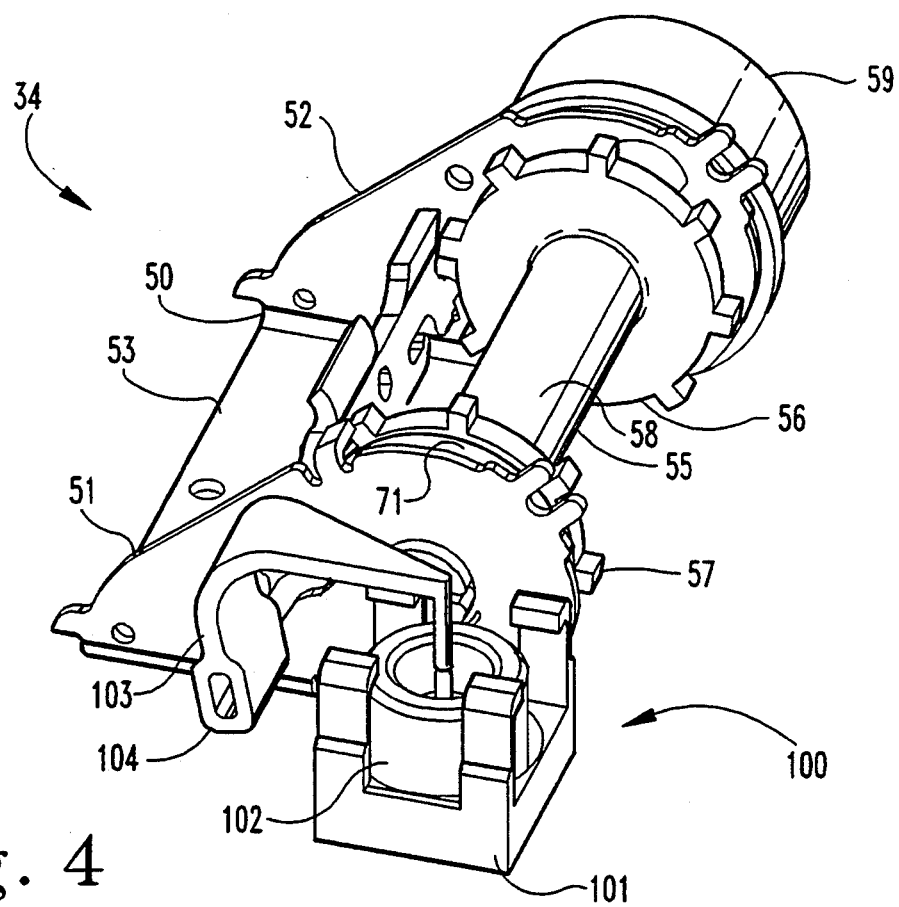
FIG. 4 is a perspective view of the delayed locking retractor.
Figure 5:
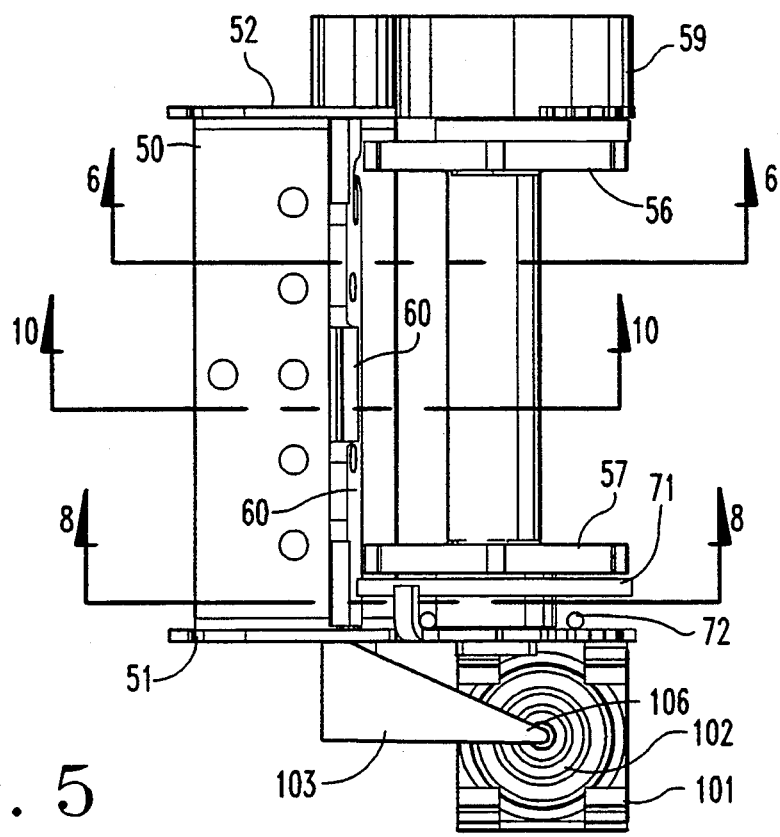
FIG. 5 is a top view of the retractor of FIG. 4.

The delayed locking retractor 34 is shown in FIGS. 4 and 5 with its outer housing removed to illustrate the internal components. Retractor 34 includes a metal frame 50 having a pair of upstanding side walls 51 and 52 integrally connected to a base wall 53 extending therebetween. An axle 54 is mounted to and extends between side walls 51 and 52 with a web spool 55 fixedly mounted to the axle so that the axle and spool will rotate as a unit. Spool 55 has a pair of disc shaped end walls 56 and 57 integrally mounted to a cylinder 58 having the web wound thereon. The web has been deleted from FIGS. 4 and 5 to more clearly illustrate the retractor.

A spring device 59 is fixedly mounted to side wall 52 and includes a spring extending between side wall 52 and axle 54. The spring is operable to cause the axle and spool to rotate retracting the web into the retractor with the spring being yieldable to allow the web to be extended from the retractor. The web is extendable from the right side of the retractor as viewed in FIGS. 4 and 5.

Figure 6:
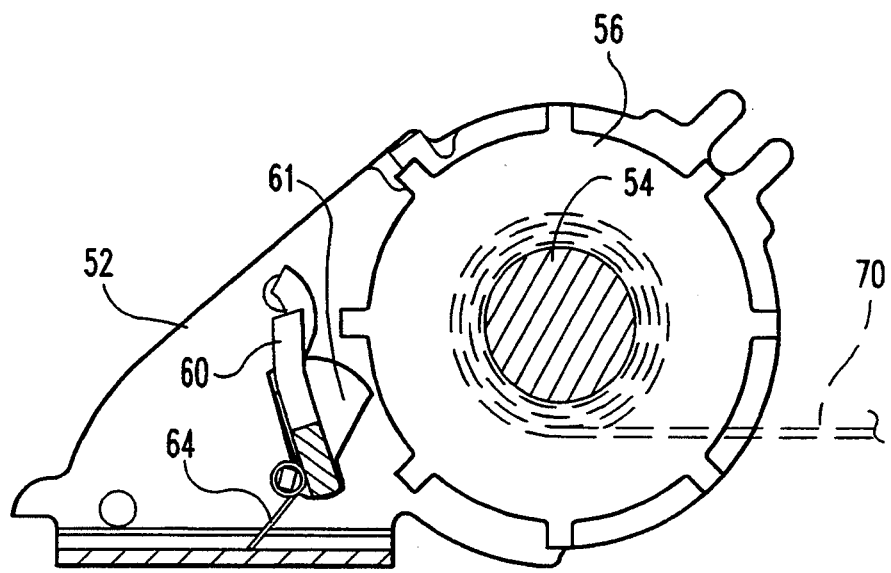
FIG. 6 is cross sectional view taken along the line 6—6 of the FIG. 5 and viewed in the direction of the arrows showing the pawl unlocked relative to the spool.
Figure 7:
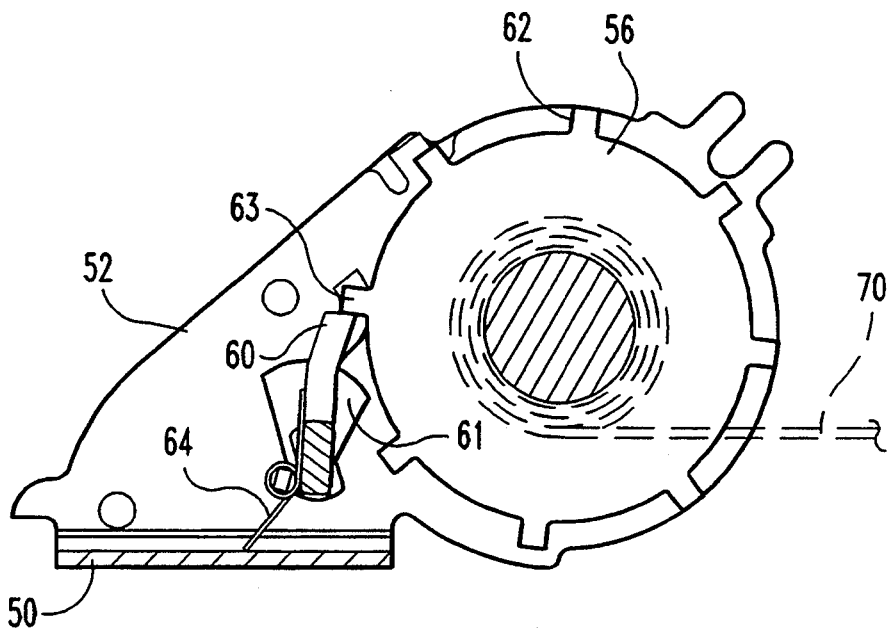
FIG. 7 is the same view as FIG. 6 only showing the pawl and spool in a locked condition.

A locking pawl 60 is movably mounted to and extends between side walls 51 and 52 and is movable from a position spaced apart from end walls 56 and 57 of the spool to an engaged position wherein the pawl lockingly engages a plurality of ratchet teeth formed on the circumference of spool end walls 56 and 57. The frame end walls 51 and 52 include a pair of aligned apertures pivotally receiving the opposite ends of pawl 60. For example, wall 52 is provided with aperture 61 which receives one end of pawl 60. The aperture is sized to allow pawl 60 to pivot about its bottom end from an unlocked position shown in FIG. 6 wherein the pawl is spaced apart from the plurality of teeth 62 formed on the circumference of spool end wall 56 to the locked position depicted in FIG. 7 wherein pawl 60 is locked to tooth 63 of the plurality of teeth 62 formed on end wall 56. A wire spring 64 is mounted to and extends between pawl 60 and base wall 53 of the frame. Spring 64 is operable to normally urge pawl 60 into engagement with the plurality of teeth formed on the circumference of each spool end wall 56 and 57 but yieldable to allow the pawl to pivot backward in order to be spaced apart from the teeth allowing the spool to freely retract the web or to allow the web to be extended therefrom. Such construction of pawl 60 along with spool 55 as well as the spring biasing of the spool via spring device 58 is conventional in nature and is well known in the field. End 70 of the web is shown in phantom in FIGS. 6 and 7 being wound about the spool and extending outwardly from the spool on the side of the axle opposite of the location of pawl 60.

Figure 8:
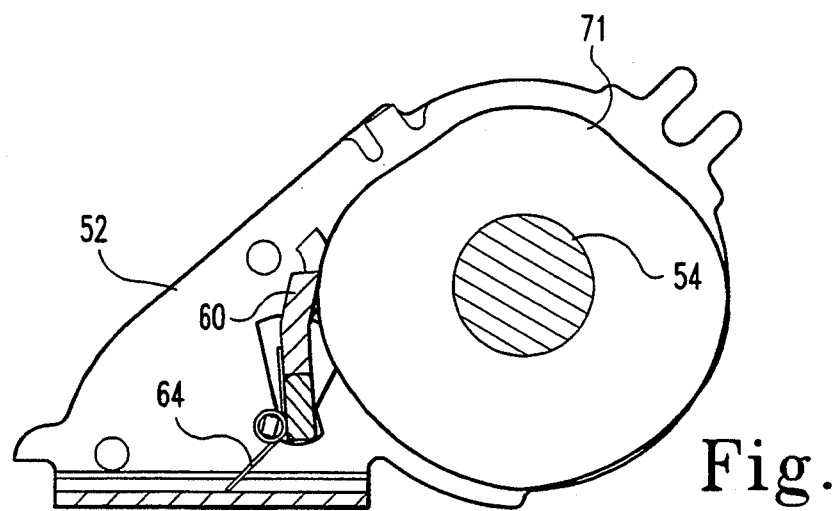
FIG. 8 is a cross sectional view taken along the line 8—8 of FIG. 5 and viewed in the direction of the arrows showing the pawl held outwardly by the cam wheel.
Figure 9:
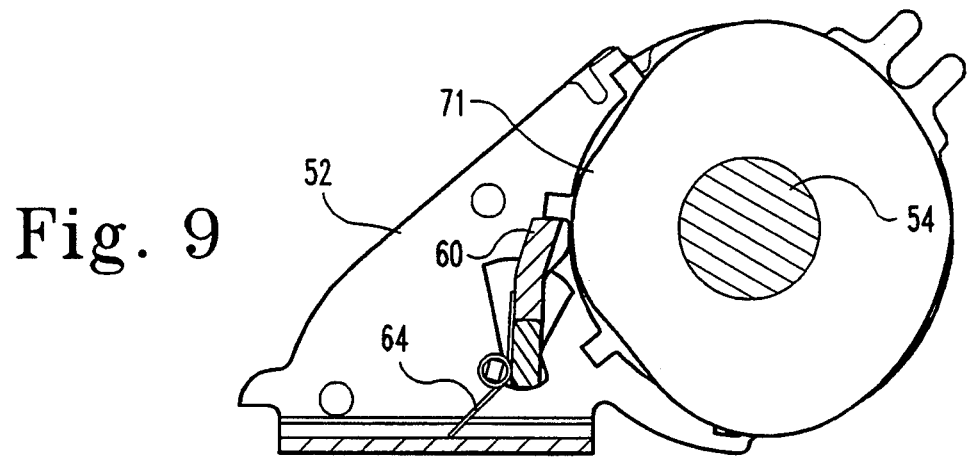
FIG. 9 is the same view as FIG. 8 only showing the cam wheel rotated apart from the pawl.

A cam wheel 71 is mounted to axle 54 and is located between spool end wall 57 and frame side wall 51. A spring 72 (FIG. 5) positioned between frame side wall 51 and cam wheel 71 is operable to force wheel 71 into frictional engagement with the outwardly facing surface on spool end wall 57. FIGS. 8 and 9 correspond to the positioning of the pawl respectively of FIGS. 6 and 7. In FIG. 8, the web is fully withdrawn with cam wheel 71 being located so that its maximum lobe contacts pawl 60 forcing the pawl apart from the spool ratchet teeth formed on the circumference of the spool end walls. In FIG. 9, the web is withdrawn a predetermined amount with the spool rotating through a sufficient angle positioning the maximum lobe of cam wheel 71 apart from pawl 60 allowing the pawl to pivot inwardly without contacting the cam wheel thereby lockingly engaging the ratchet teeth formed on the spools end walls. The construction of cam wheel 71 and its positioning relative to the pawl as well as the construction of the spring 72 to force the cam wheel to frictionally engage the spool is conventional in nature and is well known in the field.

Figure 10:
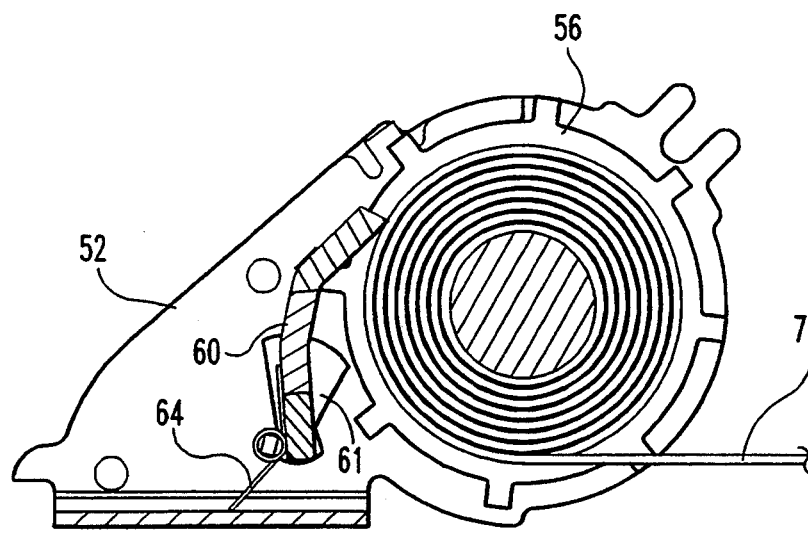
FIG. 10 is a cross sectional view taken along line 10—10 of FIG. 5 and viewed in the direction of the arrows showing an alternate device for holding the pawl apart from the spool teeth.

In lieu of utilizing a cam wheel 71 and spring 72, a web follower 75 may be fixedly mounted atop pawl 60 (FIG. 10). Web follower 75 may be a rigid element projecting toward the web wound on spool cylinder 58. Thus, when the web is fully retracted and the diameter of the web on the spool is relatively large, the distal end of web follower 75 will contact the web holding pawl 60 outwardly and apart frown the ratchet teeth formed on the opposite spool end walls. As the web is withdrawn or extended, the diameter of the web on the spool will decrease allowing web follower 75 to pivot toward the spool axis along with pawl 60 until the pawl lockingly engages the ratchet teeth formed on the spool end walls. Web follower 75 may be located equally distant between the spool end walls 56 and 57 so as to not contact the ratchet teeth.

Figure 11:
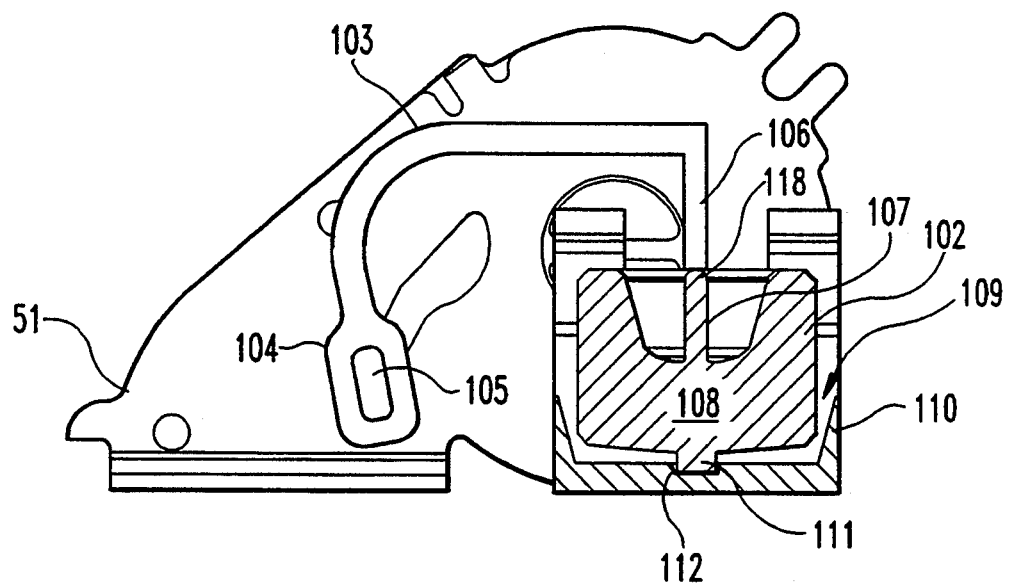
FIG. 11 is a cross sectional view of the retractor inertial device mounted to the end of the retractor of FIG. 5 with the inertial mass in the initial resting position.

The inertial mechanism is mounted to the frame 50 of the retractor and is located adjacent one of the frame side walls. In the embodiment shown in FIGS. 4 and 5, the inertial mechanism 100 includes a base wall 101 fixedly mounted to frame side wall 51 supporting a mass 102 which rests thereupon. An arm 103 includes a proximal end 104 fixedly mounted to the outwardly extending end 105 of pawl 60 with the arm then extending upwardly to its distal end 106 (FIG. 11) positioned immediately over mass 102.

Mass 102 has a hollow interior with a stem 107 centrally located within the hollow interior and fixedly mounted to the base 108 of the mass. The top end 118 of the stem is rounded and is contactable by the downwardly extending distal end 106 of arm 103 once a predetermined amount of web has been withdrawn or extended from the retractor so as to move the maximum lobe of cam wheel 71 apart from pawl 60. Thus, as pawl 60 starts to pivot toward the ratchet teeth, the distal end 106 of the arm 103 will move into contact with tile top end 118 of stem 107 limiting further movement of arm 103 as well as movement of pawl 60 thereby allowing the web spool to freely rotate.

Figure 12:
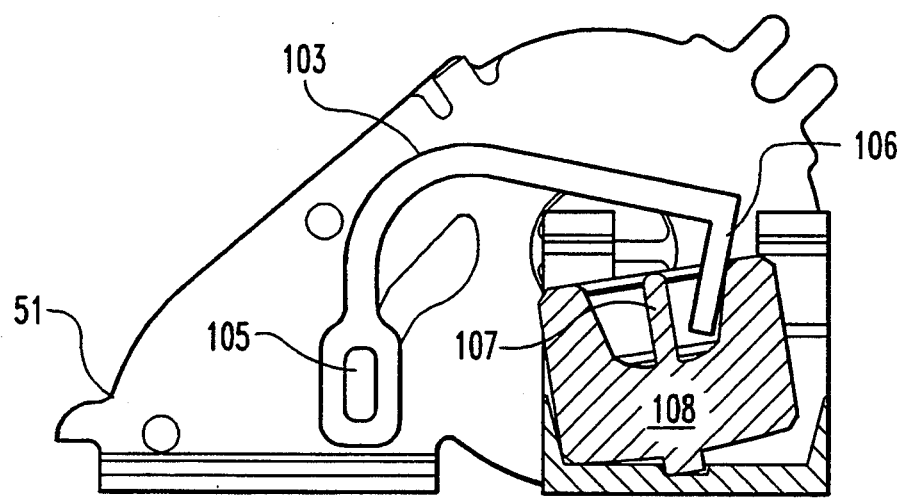
FIG. 12 is the same view as FIG. 11 only showing the inertial device in the locked position.

In one embodiment, mass 102 is cylindrical in configuration and is positioned within recess 109 formed by a circular side wall 110 integrally attached to base wall 101. A tit 111 projecting downwardly from and integrally attached to base 108 of the mass is received by a recess 112 located on the upwardly facing surface of base 101 and located centrally with respect to the circular side wall 110. Tit 111 has a sufficient length to position the bottom surface of base 108 apart from the upwardly facing surface of base 101 thereby causing the mass to be mounted in an unstable fashion. As a result, slight movement of the vehicle causing movement of the retractor frame will result in the mass tilting thereby causing end 106 of arm 103 to disengage the top end 118 of stem 107. The arm end 106 will then fall downwardly into the hollow interior of the mass (FIG. 12) allowing the pawl to pivot to the locked position engaging the ratchet teeth formed on tile sprocket end walls assuming a sufficient amount of web has been withdrawn from the retractor to locate the cam wheel 71 apart from the pawl. In the event cam follower 75 is utilized in lieu of the cam wheel, then a sufficient amount of web must be withdrawn to reduce the diameter of the web on the spool to allow the pawl to pivot to the locked position once mass 102 is moved from its original resting position depicted in FIG. 11 to its new position caused by the movement of the vehicle and retractor frame.

The preferred embodiment of the inertial device is shown in FIGS. 4 and 5. Various alternate inertial devices are contemplated and included in the present invention. For example, retractor 120 (FIG. 13) provides the delayed locking feature as previously described. The retractor is identical to the retractor as shown in FIG. 5 with the exception that inertial device 100 is replaced with inertial device 123. Thus, the retractor includes a pair of side walls 51 and 52 integrally joined to the base wall 53. An axle 54 extends therebetween having the spool fixedly mounted thereon windingly receiving the web 32 with the distal end 122 of the web located on the side of the axle opposite from the side where at the inertial device is located.

Figure 13:
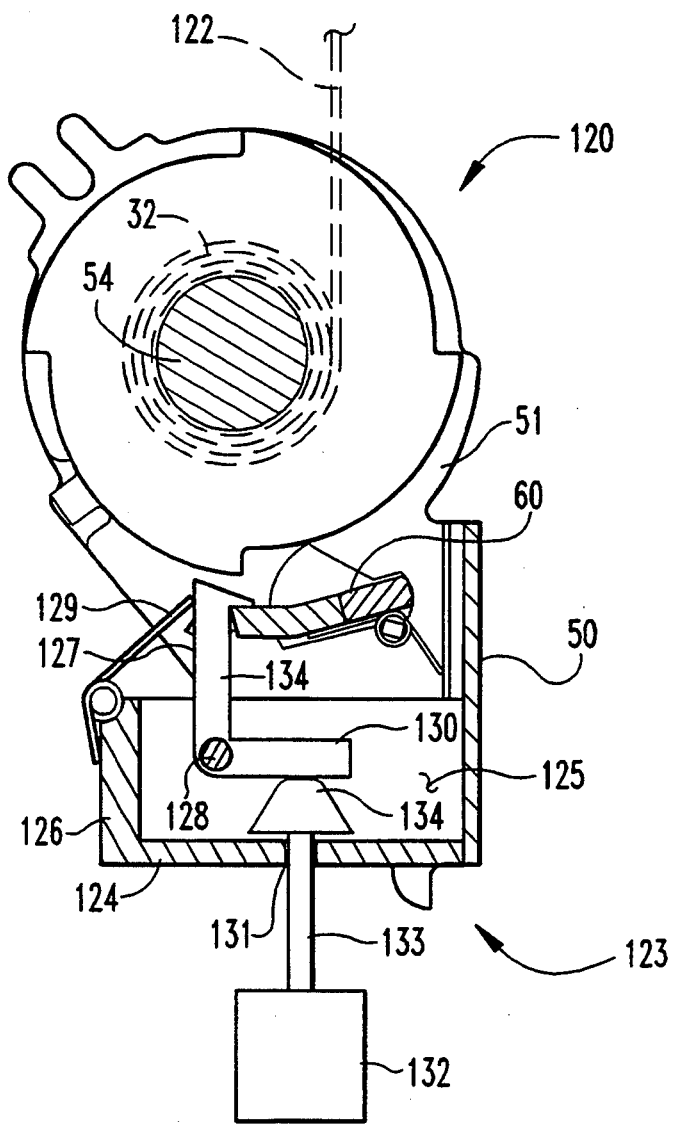
FIG. 13 is a cross-sectional view of an alternate intertial device to be used in lieu of the device of FIG. 11.

Inertial device 123 includes a box construction opened toward the spool with the base wall 124, side walls 125 and 12B being illustrated in FIG. 13. An L-shaped catch 127 is pivotally mounted by pin 128 fixedly attached to side wall 125 and the side wall opposite of wall 125. Catch 127 may therefore freely pivot about pin 128. A wire spring 120 is mounted to wall 128 and has an end contacting the vertical wall 134 of catch 127 thereby urging the catch in a clockwise direction as viewed in the drawing. The top end of wall 134 is hooked shaped being extended around pawl 60 to hold the pawl normally in the unlocked position. A pendulum is freely mounted to wall 124 which includes an aperture 131 through which pendulum stem 133 extends. Stem 133 is connected to and extends between bottom mass 132 and button head 134. Head 134 is located immediately beneath the horizontally extending wall 130 of the catch. The retractor of FIG. 5 is mounted so that base wall 83 extends horizontally whereas the retractor of FIG. 13 is mounted so that base wall 53 extends vertically thereby allowing the pendulum to extend vertically.

With the web fully retracted on retractor 120, the cam wheel 71 (not shown in FIG. 13) is operable to hold pawl 60 outwardly apart from the spool ratchet teeth. Once a predetermined amount of web has been withdrawn, the cam wheel rotates apart from the ratchet teeth; however, the hook shaped top end of catch 127 is operable to hold the pawl in the outward position spaced apart from the spool ratchet teeth. Wall 134 of the catch remains vertical since the enlarged button head located beneath wall 130 of the catch normally urges wall 134 to assume a vertical position against the urging of spring 129.

Once the vehicle is in motion, the resultant forces acting on the vehicle frame and the retractor frame are operable to cause a slight pivoting motion of mass 132 thereby nudging wall 130 of the catch to pivot in a counterclockwise direction releasing the top hook shaped end of the catch apart from the pawl and allowing the pawl to pivot inwardly engaging the ratchet teeth of the spool. Once the pawl is engaged with the sprocket teeth, the top hook shaped end will not engage the pawl even though the pendulum assumes a vertical condition since the pawl has pivoted inwardly against the ratchet teeth in a sufficient distance apart from the catch. Thus, in order to reset the inertial device, the web tongue must be released from the buckle and tile web withdrawn into the retractor causing the cam wheel 71 to force the pawl backwardly apart from tile sprocket ratchet teeth and allowing the hook shape top end of the catch to once again engage and hold the pawl.

An additional embodiment of the inertial device, not shown, includes a ball movable within a cage mounted to the base of the retractor. The cage includes a pivotally mounted top catch which is movable upwardly once the ball has moved from its resting position under the influence of force caused by the vehicle and retractor motion. An arm mounted to the end of the pawl similar to arm 103 extends towards the cap with an intermediate member disposed between the cap and arm. The intermediate member is operable to normally retain the arm and pawl in an unlocked position until the intermediate member is contacted and moved by the upwardly moving cap triggered by vehicle motion and resultant retractor frame motion. Once the intermediate member is moved by the cap, the arm is released by the intermediate member and therefore pivots along with the pawl toward the sprocket with the pawl lockingly engaging the sprocket teeth once the predetermined amount of web has been withdrawn from the retractor and the cam wheel has pivoted apart from the pawl as previously described for the prior embodiments.

The delayed locking retractor disclosed herein is a pre-emergency retractor in that the retractor will trigger and lock prior to an emergency and upon vehicle motion and resultant retractor frame motion. The retractor pawl provides a first means normally urged to a locked position with the spool ratchet teeth to limit rotation of the spool in the unwinding direction with the pawl or first means being yieldable to move to an unlocked position apart from the spool thereby allowing the spool to rotate in the winding direction as well as the unwinding direction. The cam wheel 71 or web follower 75 provide a second means operable to retain the pawl in the unlocked position until a predetermined amount of web has been extended from the retractor. The various embodiments of the inertial devices provide a third means engaged with the pawl and each of which have a mass in a first position whereat once a predetermined amount of web has been extended will retain the pawl in the unlocked position until the mass is moved upon pre-emergency movement of the frame thereby allowing the pawl to move to the locked position. Notably, the pawl remains in the locked position once moved thereto until the web is rewound to its initial condition with the cam wheel or web follower moving the pawl to its unlocked position.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A pre-emergency delayed locking retractor comprising:
   a frame;
   a web;
   a spool with said web wound thereon and having a plurality of ratchet teeth formed thereon, said spool is rotatably mounted on said frame being rotatable between an initial position whereat said web is retracted on said spool and an in-use position whereat said web is extended;
   a spring connected between said spool and said frame to urge said spool to rotate in a winding direction to wind said web thereon but yieldable to allow said spool to rotate in an unwinding direction to allow said web to be extended therefrom;
   first means mounted on said frame urged to move to a locked position engaging said teeth and limiting rotation of said spool in said unwinding direction but yieldable to move to an unlocked position to allow said spool to rotate in the winding direction and said unwinding direction;
   second means operable to retain said first means in said unlocked position until a predetermined amount of web has been extended; and,
   third means engaged with said first means and having a mass in a first position whereat said third means once said predetermined amount of web has been extended retains said first means in said unlocked position until said mass is moved upon pre-emergency movement of said frame allowing said first means to move to said locked position, said first means remaining in said locked position once moved to said locked position until said web is rewound to said initial condition and said second means moves said first means to said unlocked position.

2. The retractor of claim 1 wherein:
said first means includes a pawl movably mounted to said frame adjacent said spool with said pawl urged to move to a locked position engaging said teeth and limiting rotation of said spool in said unwinding direction but yieldable to move to an unlocked position.

3. The retractor of claim 2 wherein:
said second means includes a cam wheel mounted to said frame and rotatable with said spool, said wheel positioned to block said pawl from engaging said teeth when said spool is in said initial position with said wheel rotating to an unblocking position when said predetermined amount of web has been extended.

4. The retractor of claim 2 wherein:
said second means includes a web engager on said pawl which holds said pawl out of engagement with said teeth when said spool is in said initial position and said web engager is in contact with said web.

5. The retractor of claim 2 wherein:
said third means includes a base mounted to said frame with said mass mounted to said base and located in a resting position, said third means further includes an arm operably located between said pawl and said mass with said arm engaged with said pawl and retaining said pawl in said unlocked position when said mass is in said resting position and said web is extended to said in-use position and with said arm moving allowing said pawl to move to said locked position when said mass moves relative to said base.

6. The retractor of claim 5 wherein:
said mass includes an upstanding projection contactable by said arm when said predetermined amount of web has been extended limiting movement of said pawl to said locked position until said mass moves relative to said mass moving said upstanding projection away from said arm and allowing said arm to move with said pawl to said locked position.

7. The retractor of claim 6 wherein:
said mass is mounted in an unstable fashion to said base and said base includes retaining means to retain said mass thereon at all times.

8. The retractor of claim 2 wherein:
said third means includes a base mounted to said frame with said mass suspended therefrom, said third means further includes a pivotally mounted catch mounted to said base with a hook shaped end releasably engagable with said pawl and a bottom end contactable by said mass upon movement of said mass to release said pawl.

9. A seat for a child in a vehicle comprising:
frame means;
a seat formed to receive a child with said seat mounted on said frame means;
a harness web movably mounted on said seat and extendable from an initial position whereat said web is not in use to an in-use position whereat said web extends across a child positioned atop the seat; and,
pre-emergency delayed retractor means mounted to said frame means and operable to windingly retract and to extend said web and wherein:
said retractor means includes:

a spool with said web wound thereon and having a plurality of ratchet teeth formed thereon, said spool is rotatably mounted on said frame means;

spring means connected between said spool and said frame means to urge said spool to rotate in a winding direction to wind said web thereon but yieldable to allow said spool to rotate in an unwinding direction to allow said web to be extended therefrom;

pawl means mounted on said frame means urged to move to a locked position engaging said teeth and limiting rotation of said spool in said unwinding direction but yieldable to move to an unlocked position to allow said spool to rotate in said winding direction and said unwinding direction;

engagable means operable to retain said pawl means in said unlocked position until a predetermined amount of web has been extended; and, inertial means engaged with said pawl means with said inertial means having a mass in a resting position whereat said inertial means once said predetermined amount of web has been extended retains said pawl means in said unlocked position until said mass is moved to a new position upon pre-emergency movement of said frame means allowing said pawl means to move to said locked position, said pawl means remaining in said locked position once moved to said locked position until said web is rewound to said initial condition and said engagable means moves said pawl means to said unlocked position.

10. The seat of claim 9 wherein:

said inertial means includes an upstanding finger mounted to said mass and an arm having a proximal end mounted to said a pawl means with said arm having a distal end positioned over said upstanding finger, said distal end contacting said finger and resting thereatop while said mass is in said resting position limiting movement of said arm and said pawl means but movable apart when said mass moves to said new position allowing said arm with said pawl means to move to a locked position relative to said teeth.

11. A locking retractor comprising:

a frame;

a web;

a spool with said web wound thereon and having a plurality of ratchet teeth formed thereon, said spool is rotatably mounted on said frame being rotatable between an initial position whereas said web is retracted on said spool and an in-use position whereas said web is extended;

a spring connected between said spool and said frame to urge said spool to rotate in a winding direction to wind said web thereon but yieldable to allow said spool to rotate in an unwinding direction to allow said web to be extended therefrom;

a pawl mounted on said frame to move to a locked position engaging said teeth and limiting rotation of said spool in said unwinding direction and to move to an unlocked position to allow said spool to rotate in said winding direction and said unwinding direction;

a pawl holder to retain said pawl in said unlocked position until a predetermined amount of web has been extended; and a device engaged with said pawl and having a first position whereas once said predetermined amount of web has been extended retains said pawl in said unlocked position until said device is moved allowing said pawl to move to said locked position, said pawl remaining in said locked position once moved to said locked position until said web is rewound to said initial condition; and, wherein:

said device has a mass in a first position whereat once said predetermined amount of web has been extended retains said pawl in said unlocked position until said mass is moved upon pre-emergency movement of said frame allowing said pawl to move to said locked position.

12. The retractor of claim 11 wherein:

said device includes a pendulum upon which said mass is suspended, said device further includes a catch movably mounted to said frame and disposed between said pendulum and said pawl, said pendulum and mass in a resting position with said catch releasably lockable to said pawl to hold said pawl apart from said teeth until said mass is moved by movement of said frame releasing said catch relative to said pawl and allowing said pawl to engage said teeth.

13. The retractor of claim 11 wherein:

said device includes a base wall upon which said mass rests, said device further includes an arm mounted to said pawl which extends over and contacts said mass, said mass and base wall includes unstable means operable to tip said mass relative to said base wall upon movement of said base wall moving said mass apart from said arm and allowing said arm and said pawl to pivot and allowing said pawl to engage said teeth.

14. The retractor of claim 13 wherein:

said pawl holder includes a cam wheel movably mounted to said frame, said cam wheel includes a major lobe normally contacting and holding said pawl apart from said teeth when said web is retracted with said cam wheel movable upon web extension to move said major lobe apart from said pawl allowing said pawl to engage said teeth.

15. A pre-emergency delayed locking retractor comprising:

a frame;

a web;

a spool with said web wound thereon and having a plurality of ratchet teeth formed thereon, said spool is rotatably mounted on said frame being rotatable between an initial position whereat said web is retracted on said spool and an in-use position whereat said web is extended;

a spring connected between said spool and said frame to urge said spool to rotate in a winding direction to wind said web thereon but yieldable to allow said spool to rotate in an unwinding direction to allow said web to be extended therefrom;

first means mounted on said frame urged to move to a locked position engaging said teeth and limiting rotation of said spool in said unwinding direction but yieldable to move to an unlocked position to allow said spool to rotate in the winding direction and said unwinding direction;

second means engaged with said first means and having a mass in a first position whereat said second means retains said first means in said unlocked position until said mass is moved upon pre-emergency movement of said frame allowing said first means to move to said locked position, said first means remaining in said locked position once moved to said locked position until said web is rewound to said initial position and said first means is moved to said unlocked position.

* * * * *

UNITED STATES PATENT AND TRADEMARK OFFICE
CERTIFICATE OF CORRECTION

PATENT NO.   : 5,370,333
DATED        : December 6, 1994
INVENTOR(S)  : Allan R. Lortz and David D. Merrick It is certified that error appears in the above-identified patent and that said Letters Patent is hereby corrected as shown below:

Column 1, line 20 delete "frown" and insert --from--;
Column 1, line 62 delete "amount" and insert --mount--.
Column 2, line 43 delete "mad" and insert --and--.
Column 4, line 36 delete "smiled" and insert --skilled--;
Column 4, line 56 delete "seal" and insert --seat--.
Column 6, line 34 delete "Fully" and insert --fully--;
Column 6, line 38 delete "wails" and insert --walls--.
Column 7, line 64 delete "12B" and insert --126--;
Column 7, line 68 delete "120" and insert --129--;
Column 7, line 68 delete "128" second occurrence and insert --126--.
Column 8, line 12 delete "83" and insert --53--;
Column 8, lines 41 and 43 delete "tile" and insert --the--.
Column 11, line 50 delete "whereas" and insert --whereat--.

Signed and Sealed this

Seventh Day of March, 1995

Attest:

Attesting Officer

BRUCE LEHMAN

Commissioner of Patents and Trademarks